Oct. 28, 1958  W. F. ZIMMERMANN ET AL  2,857,818
LINEAR CYCLE HOBBING MACHINE
Filed Feb. 16, 1953  6 Sheets-Sheet 1

INVENTORS
WILLIAM F. ZIMMERMANN
GRANGER DAVENPORT
BY

ATTORNEY

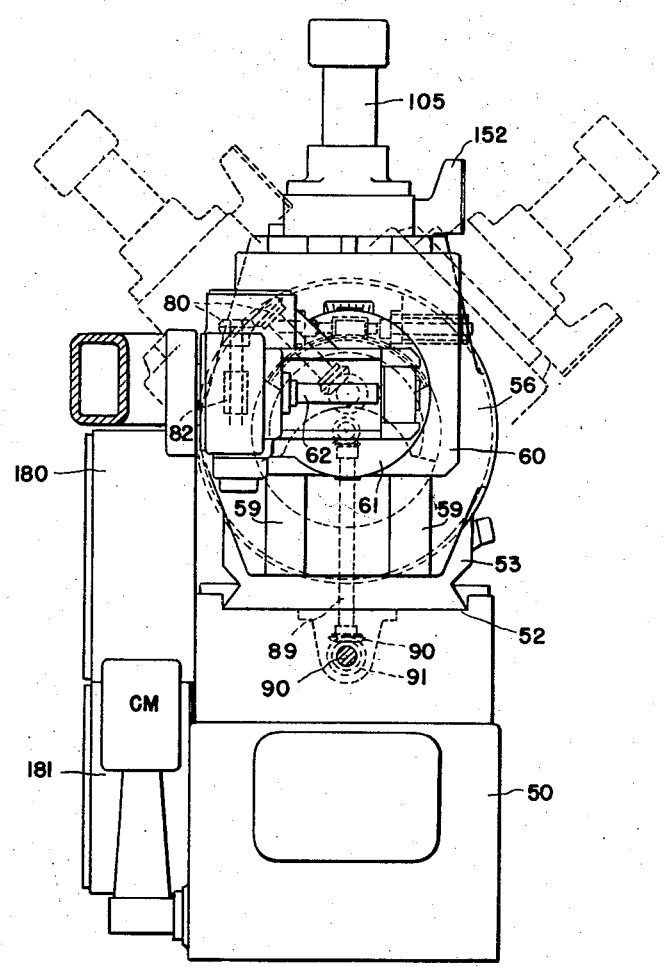

Oct. 28, 1958   W. F. ZIMMERMANN ET AL   2,857,818
LINEAR CYCLE HOBBING MACHINE

Filed Feb. 16, 1953   6 Sheets-Sheet 3

R.H.

L.H.

HOB AND WORK STOP ROTATING
DWELL
NORMAL FEED
FAST RETURN
PLUNGE FEED

DWELL

INVENTORS
WILLIAM F. ZIMMERMANN
GRANGER DAVENPORT
BY
Harold F. Scribner
ATTORNEY Oct. 28, 1958   W. F. ZIMMERMANN ET AL   2,857,818
LINEAR CYCLE HOBBING MACHINE
Filed Feb. 16, 1953   6 Sheets-Sheet 5

INVENTORS
WILLIAM F. ZIMMERMANN
GRANGER DAVENPORT
BY
Harold F. Scribner
ATTORNEY

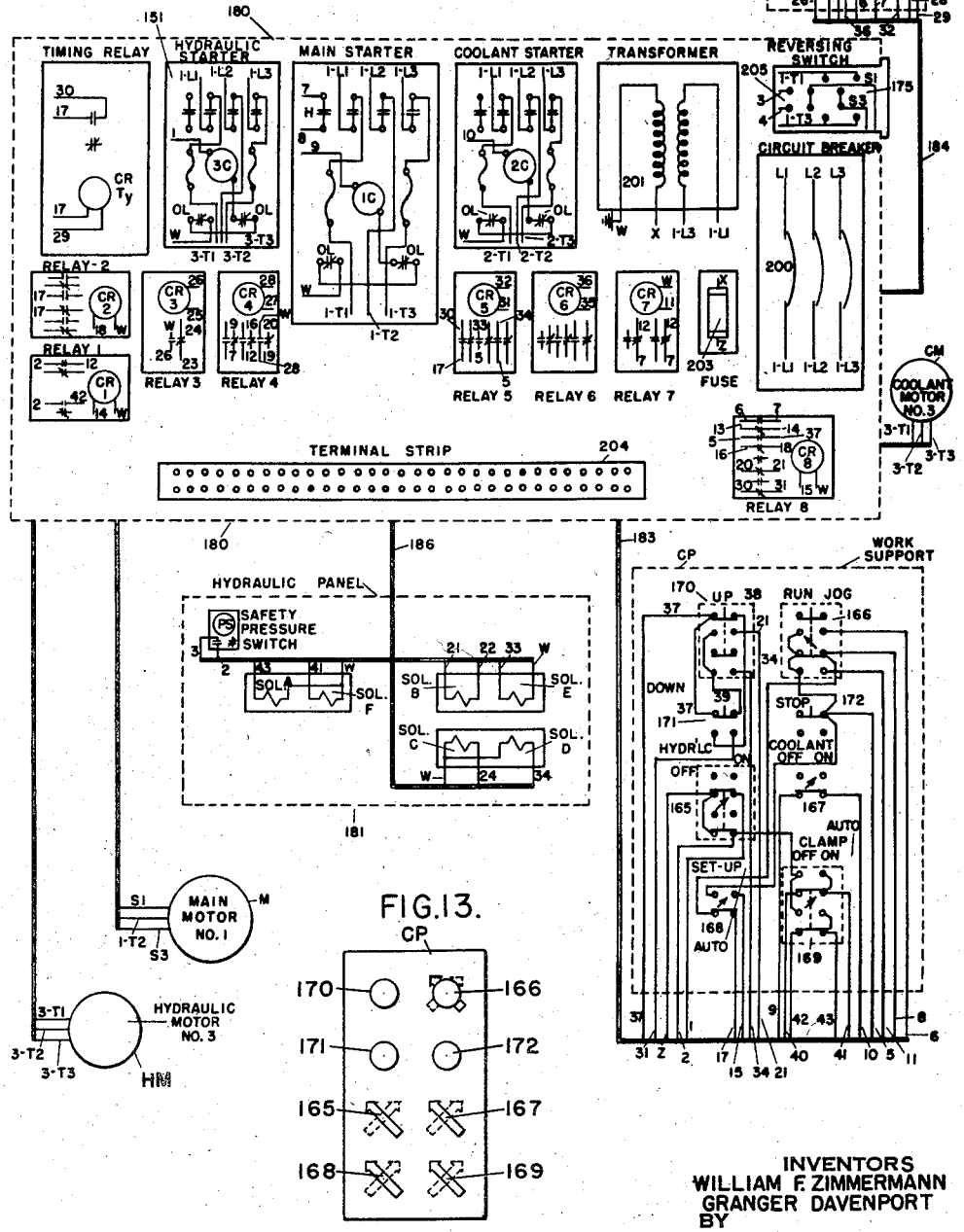

2,857,818

LINEAR CYCLE HOBBING MACHINE

William F. Zimmermann, Maplewood, and Granger Davenport, Montclair, N. J., assignors to Gould & Eberhardt, Incorporated, Irvington, N. J., a corporation of New Jersey Application February 16, 1953, Serial No. 337,008

9 Claims. (Cl. 90—4)

This invention relates to hobbing machines and the art of generating teeth on work blanks and is concerned more particularly with an improved method and means for hobbing the teeth of either spur or helical gears of either hand without employing differential producing mechanism in the hob-driving or in the work-index transmissions. The present invention, which is a continuation in part of our application Serial No. 337,007, filed February 16, 1953, is concerned more especially with the hob-driving and work-driving transmissions of the hobber and with an improved means for effecting relative translatory movements between the hob and the work whereby machine set-up time, as well as the time consumed in producing the teeth on a blank, is measurably reduced.

A primary aim of the invention is to eliminate the need for employing interrupted and rectangular feed cycles and to simplify and reduce the number of motions and the directions of movements between the hob and the work blank to a simple linear path in such a manner that the machine automatically comes to rest upon completion of a single uninterrupted forward and return operational cycle at which time the finished work may be removed and the machine reloaded for a repeat cycle.

Another aim of the invention is the construction of a hobbing machine capable in operation to effect material savings in the actual time consumed in hobbing a given gear by taking advantage of the fact that the rate of feed of the hob relative to the work may in accordance with this invention be increased during that portion or portions of the cycle in which the hob is not cutting full tooth depth and also that the feed rate may be changed, e. g., from relatively fast to relatively slow during the cutting operation.

Still a further aim of the invention is to effect a hobbing of gears with the hob rotating in a direction as for climb cutting with relation to the direction of feed so that not only do hob rotation and the resulting forces assist the feed but that the individual cuts are taken big and first whereby there is produced a superior finish on the flanks of the gear teeth with an appreciable lengthening of hob service between grinds.

Another objective of the invention is to hob helical gears, utilizing in combination the aforementioned simple linear cycle and the principle of changing feed rate while in the cut, while rotating the hob and the work in constant speed ratio, i. e., nondifferentially in unison and at the completion of the cutting operation to back track the hob to the place of starting through the spaces between the teeth that have just been generated.

Prior to this invention it was the practice to impart a shifting movement of the hob in a rectangular path or in an interrupted linear path. In the former the hob was fed radially of the blank to the required depth then axially of the blank at a constant rate of speed until the gear was completed, and then radially outwardly to clear the finished work and then axially in the opposite direction to the place of beginning. In the interrupted linear cycle the hob was fed axially of the work at a fast rate until the work was about to be engaged at which time the feed was reduced and the cutter caused to enter the work at the reduced rate which was continued unchanged until the gear was completed. At this point the machine was stopped and the work removed after which the hob was traversed back to the point of beginning, again stopped, and the machine reloaded. In the prior machines valuable time is lost in changing directions, feeding at a constant rate, loading at one point in the cycle and unloading at another, not to mention the additional mechanisms and the complexities in the controls required for the several operations.

The structure and method of operation of the present hobbing machine departs from conventional practice in a number of significant respects among which may be noted the combination of a simple linear cycle, oblique feeding, climb cutting, plunge feeding the hob into the work and changing the feed rate while in the cut, rotating work and hob at a constant speed ratio for either spur or helical gear cutting, and back traversing of the hob in the same path through the finished work to the place of beginning. At the completion of such a cycle the machine is caused automatically to come to rest, the finished work may then be removed, and the machine reloaded for a repeat cycle. In addition to the foregoing and in combination therewith it is proposed also to cause the hob, in the case of an upright machine, to enter the work at the plunge feed rate from the underside and to feed upwardly while generating the teeth and upon completion of the cutting to back travel the hob downwardly to its starting point below the work and out of the way.

In attaining the above objectives, and others hereinafter appearing, it is proposed to provide a machine with a main support common to the tool and the work and to effect relative bodily movement between the hob and the gear blank, in a direction that is common to the helix angle of both the hob and the work. When so related and shifted, the plane of the hob will lie tilted relative to the line of its travel, and its line of shift will be tilted relative to the axis of the work.

When such relations obtain it will be seen that if the bodily movement between the hob and work is caused to occur in a direction of the helix angle of the teeth to be cut on the gear and if the axis of the hob is tilted 90° plus its lead angle, from the line of the tooth helix on the gear, it becomes possible to shift the teeth of the one through the spaces between the teeth of the other in a straight line direction without interference, and no compensation need be made for either the lead of the hob or of the work. The straight-line feed of a cutter of this organization can be as fast as is consistent with the quality of tooth formation desired, and that, at the end of the cut, both the cutter and work rotations may be stopped and a straight-line return traverse of the stationary hob through the tooth spaces may be instituted and continued at a very rapid rate. The machine is particularly well adapted for multiple-thread hobs, to take advantage of the increased production resulting from their use.

With a hobbing machine constucted in accordance with this invention, the teeth of the hob may be initially set at full cutting depth radially of the blank and be caused to enter the blank at a relatively fast feed rate, i. e., plunge-feed, until full tooth form is reached and then slowed to a normal feed rate while both the hob and the blank are rotating together in constant speed relation (nondifferentially).

This invention thus proposes a new method and means for hobbing spur and helical gears which comprehends a fast transitional feed followed by a normal feed of one of two power-rotated elements relative to the other, the elements being rotated in constant-speed ratio on axes crossed at selectively variable amounts, with the change in feed rate from fast to slow being caused to occur automatically when the cutter has plunged into the work and is reaching full-tooth cutting relation with the blank.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 1 of the drawings is a side elevation of a hobbing machine embodying the invention.

Fig. 3 is front view of the machine, but with the work table and work-supporting column removed.

Fig. 12 is a wiring diagram for the machine.

Fig. 13 is a face view of the control panel indicating the control buttons diagrammatically.

GENERAL STRUCTURE

The structure and co-operative relation of the elements of the hobbing machine disclosed is explained more fully in the aforesaid copending application but for convenience will be briefly described here.

Figure 1:
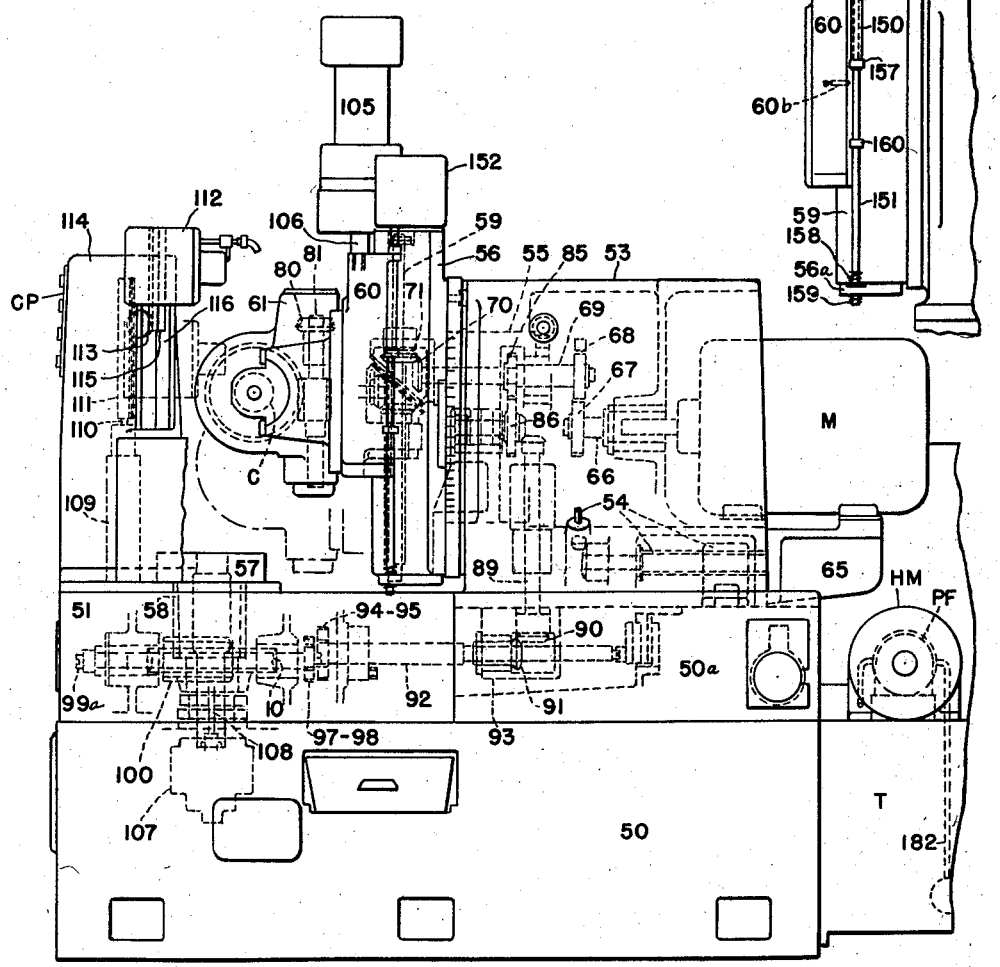
Figure 4:
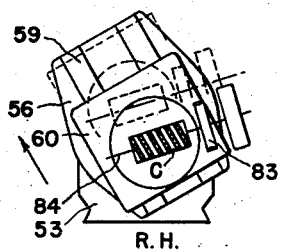
Figs. 4 and 5 are partial views of the hob swivel head, carriage, and guideways in positions assumed for cutting right-hand and left-hand helical gears, respectively.
Figure 5:
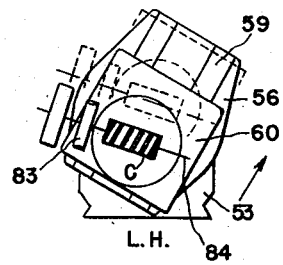
Figure 6:
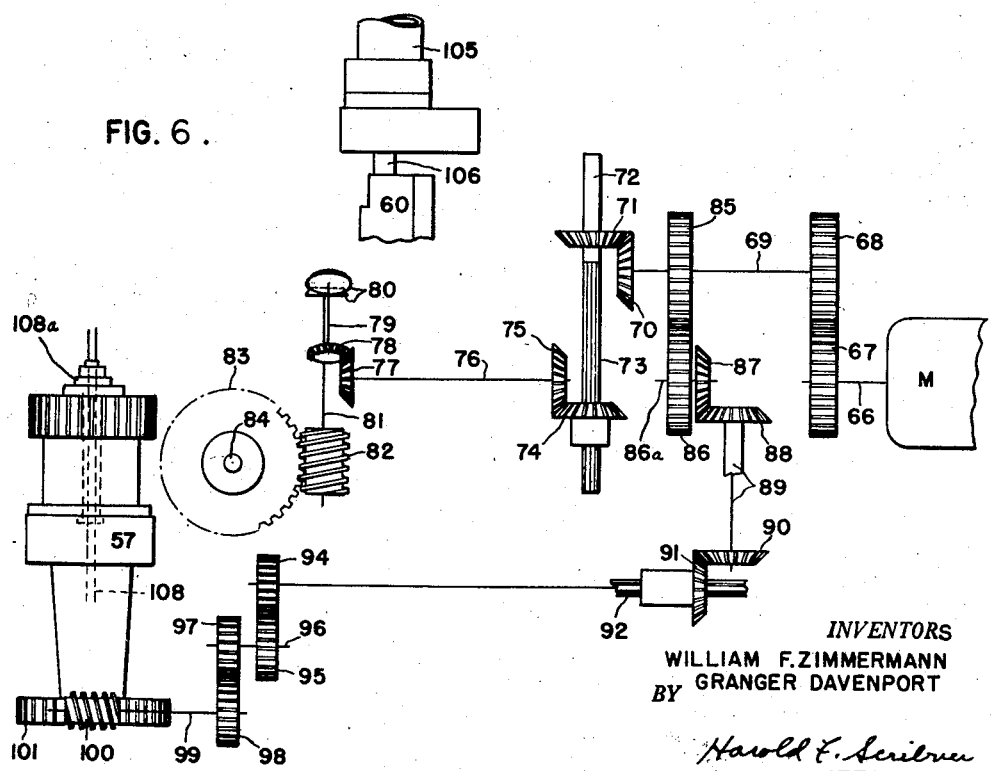
Fig. 6 is a line diagram of the gear trains embodied in the machine.

General structure (Figs. 1, 3, 6)

Referring more particularly to Figs. 1, 3 and 6, the hobbing machine illustrated comprises a two-level main base 50, the upper level 50a of which is equipped with guideways 52 adapted to support and guide a trunnion carrier 53. The trunnion carrier is adjustable longitudinally of the base, according to the diameter of the gear to be cut, by means of a manually operated screw-and-nut mechanism indicated at 54.

The trunnion carrier is provided with a large annular bearing surface 55 arranged to support a normally fixed but angularly adjustable trunnion 56. In this instance the pivotal axis of the trunnion 56 is horizontal and is perpendicular to and intersects the projected axis of the work table 57. The work table 57 is, in this embodiment, journaled on a vertical axis in tapered bearings 58 provided in a sub-base 51 that is supported upon the lower level of the main base 50.

The front of the trunnion 56 is provided with parallel guideways 59, positioned to lie in a plane normal to the trunnion axis and parallel to the work-table axis, and carries a translatable carriage 60. The carriage 60, in turn mounts an angularly adjustable hob swivel head 61 that journals a hob spindle 62 and the cutter or hob C. In the embodiment illustrated the swivel axis of the head 61 is parallel to the swivel axis of the trunnion 56, and the hob-spindle axis is perpendicular to the swivel axes of the head and the trunnion.

Hob-spindle and work-spindle drives (Figs. 1 and 6)

The main spindle drive in the machine depicted comprises two interconnected trains, namely, speed- or hob-rotating trains and index- or work-rotating trains, both driven from a common source which is here indicated by a main motor M.

The main-drive motor M is solidly mounted upon a platform 65 supported by the adjustable trunnion carrier 53, so that its output shaft 66 is coaxial with the swivel axis of the trunnion 56. The motor shaft 66 carries a gear 67 that meshes with a gear 68 on an offset shaft 69 journaled in a bearing provided in the swivable trunnion 56 on an axis paralleling the trunnion axis. The center distance of the shafts 66 and 69 is fixed but has been so selected that the gears 67 and 78 may be removed and replaced by others to afford a change in speed. In the present instance six changes in speed are contemplated.

As the angular position of the trunnion is changed, the shaft 69 and gear 68 travel around the gear 67 planetwise. The planetary shaft 69 extends forward and carries a bevel gear 70 that meshes with another bevel gear 71 secured to a shaft 72 also journaled in the swivable trunnion but on an axis perpendicular to the axis of the planetary shaft 69. A portion of the shaft 72 is splined, as at 73, and drives a splined bevel gear 74 which in turn drives a bevel gear 75 mounted on one end of a shaft 76. Shaft 76 is journaled in the carriage 60 at the axis of the hob swivel head 61, and carries another bevel gear 77 which meshes with bevel gear 78 on shaft 79. Shaft 79 is journaled in bearings provided in the hob swivel head 61, extends diagonally in the hob swivel head, and is geared by bevel gears 80 to a worm shaft 81 also journaled in the hob swivel head. A worm 82 mounted on the worm shaft is arranged to drive a worm gear 83 that drives a spindle 84 with which the hob C is connected. In the arrangement described the hob spindle is power-rotated; it may also be swiveled about the axis of shaft 76; it may also be translated bodily in either direction on the guideways 59 of trunnion 56, and the latter may be swiveled about the axis of shaft 66 so that the line of bodily shift of the hob may be vertical or slanted to the right or to the left, to an included angle of as much as 90°, and the entire assembly from motor to hob may be moved toward or away from the work spindle. It is to be noted that the swivel axis of the hob swivel head 61 intersects the hob intermediate its ends, and at least at one point in the bodily shift of the hob this swivel axis coincides with the swivel axis of the trunnion, that is, at one point shafts 76 and 66 may be coaxially aligned, and at all other points in the linear shift, the hob swivel axis is to one side of the trunnion axis or to the other. Preferably the distance of feed travel of the hob to each side of the trunnion axis is equalized, or substantially so, for reasons later to be explained.

Index train

The drive to the work table 57 is derived from the hob-drive train and is taken from the planetary shaft 69 by means of a gear 85 tight on that shaft. Gear 85 is arranged to mesh with a gear 86 mounted upon a relatively stationary parallel shaft 86a. Shaft 86a is suitably journaled in the bearings in the trunnion carrier at the trunnion axis and is therefore coaxial with the motor shaft 66. Gear 85 may accordingly roll around the driven gear 86 when the trunnion is angularly adjusted. The driven gear 86 drives a bevel gear 87 that is meshed with bevel gear 88 on a vertical shaft 89. Shaft 89 is journaled in the movable trunnion carrier 53 and carries at its lower end a bevel gear 90 that is meshed with an internally splined bevel gear 91. The gear 91 transmits power to a horizontal splined shaft 92 that is journaled in the frame members 50a and 51. The gears 90 and 91 are confined within a housing 93 that is secured to and travels with the trunnion carrier 53 so that power is transmitted to splined shaft 92 in any adjusted position of the carrier.

The splined shaft 92 extends forward, toward the work table 57 and by means of change gears 94, 95, 96 and 97 delivers power to a worm shaft 99. The worm shaft 99 extends further forward and carries a worm 100 that meshes with a wormgear 101 secured to the lower end of the work-table spindle 57.

The work index train is, it will be seen, normally connected positively and unvaryingly with the hob-drive train, both trains deriving power from the common planetary shaft 69. Thus both hob and work are caused to be power rotated at relatively constant rates, e. g., one revolution of the hob for each tooth to be cut on the blank, without an additive or subtractive differential effect of any kind.

*Feed transmission*

In the instant embodiment of the invention, relative translatory movement between the hob and the work is effected by shifting the hob carriage 60 hydraulically in the direction defined by the position of the trunnion guideways 59 relative to the work axis. When cutting a helical gear, the position of the trunnion guideways will correspond, in the normal case, to the helix angle of the helical gear to be cut. When cutting spur gears, the direction of travel of the hob will parallel the work axis and the teeth. Also, in accordance with this invention it is proposed that the feed movement of the hob be in an upward direction during the cutting operation and in a downward direction for the return, and a preferred method and means for imparting linear movement to the hob in forward and reverse direction includes a hydraulic motor 105 and a hydraulic system shown diagrammatically in Fig. 10.

In Fig. 1, the numeral 105 indicates a hydraulic motor of the piston and cylinder type, whose piston rod 106 is secured to the hob carriage 60; the numeral 107 indicates a work-clamping hydraulic motor of the piston and cylinder type, whose piston rod 108 is adatped to be connected with and operate a work-clamping fixture, by which work may be clamped to the table 57, and the numeral 109 indicates another hydraulic motor of the piston-and-cylinder type whose piston rod 110 reciprocates a rack bar 111 connected to actuate an outboard work-centering steadyrest 112. The rack bar 111 meshes with an idler gear 113 journaled in the outboard column 114, and the gear 113 in turn meshes with a rack bar 115 carried by the steadyrest 112. The steadyrest 112 is provided with vertical guideways fitting guides 116 provided on the face of the column 114. The work-clamp motor 107 is located in the base of the machine and its piston rod coaxially aligned with the work-spindle axis. The hob-feeding motor 105 is mounted at the top of the trunnion 56 and its piston rod is parallel with the guideways 59 thereof. These several hydraulic cylinders are interconnected and controlled as will now be explained.

Figure 10:
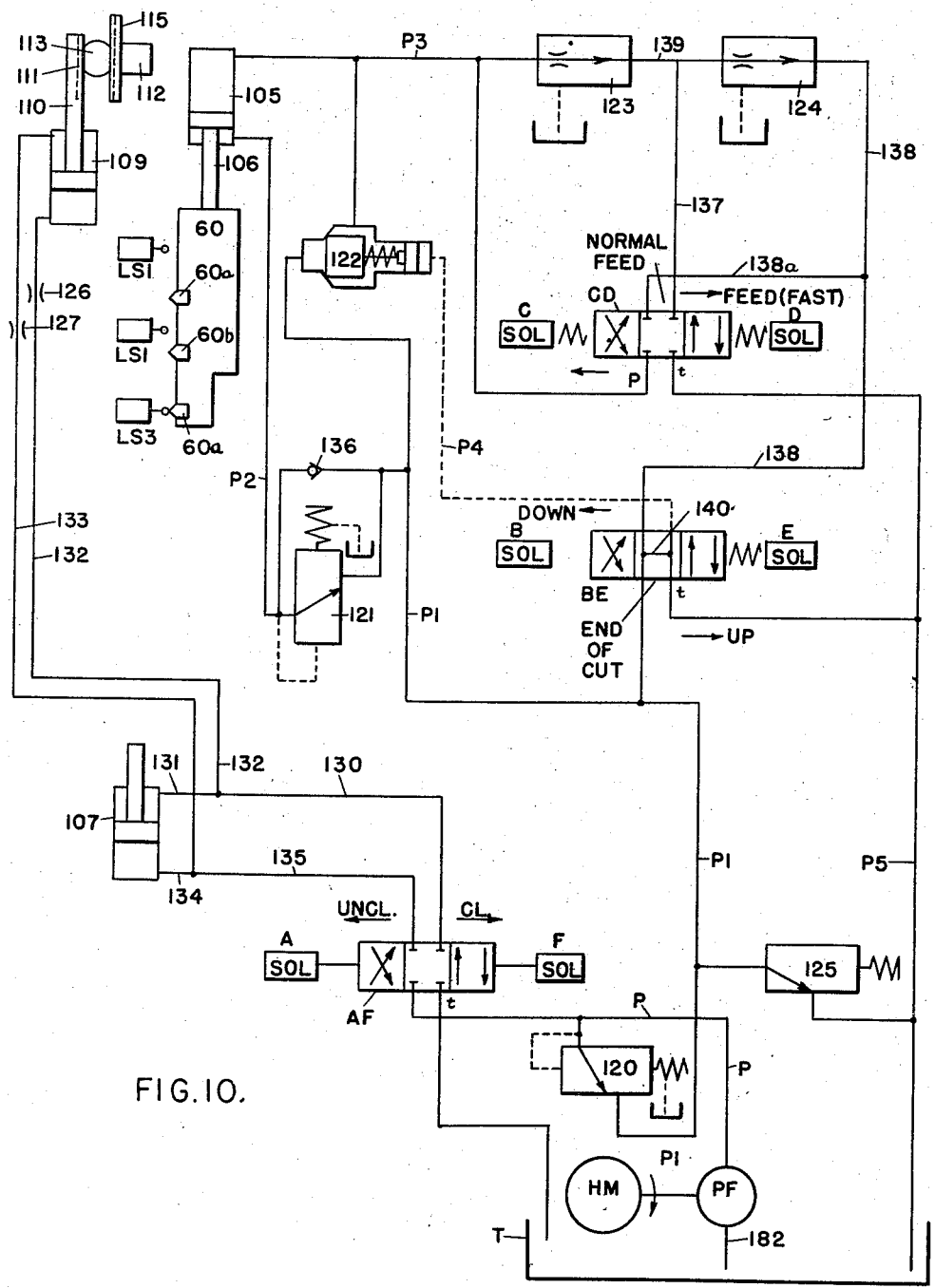
Fig. 10 is a line piping diagram of the hydraulic system and in which conventional symbols are used to indicate the various valves, control elements, and their connections.

In Figs. 1 and 10 the letter T indicates a tank, reservoir, or collecting basin from which cylinder actuating fluid is derived and to which expended fluid is returned. The letters HM indicate an electric motor connected to drive a vane-type constant-delivery hydraulic pump PF. The pump PF takes fluid from the tank T and delivers it into the line marked P.

In Fig. 10 the characters AF, BE and CD indicate 4-way valves of a well-known make, solenoid-operated. Valve AF has a closed center position and is caused to operate without a spring. Valve BE has an open-center position and is spring-centered. Valve CD has a closed center position and is spring-centered. The various possible directions of flows through the valves are indicated by the arrows on the valve symbols. In the positions of the valves shown the flows are cut off as in valves AF and CD, or bridged as in valve BE. Numeral 120 indicates a sequence valve of the direct-operated type whose function in the system is to remain closed to line P1 (is indicated) until the pressure in line P attains a predetermined operating value.

Numeral 121 indicates a counterbalance valve, directly operated, whose function is to permit a flow from P1 to P2 and the underside of the piston of the carriage cylinder 105, but to check the return unless or until a pressure somewhat greater than the weight of the carriage exists in the cylinder 105 at the upper side of the piston. Thus, if the carriage is being propelled upwards and there is a failure of hydraulic power, the carriage is hydraulically locked against falling.

Numeral 122 indicates a check valve designed to prevent flow of fluid from line P1 to line P3 during upfeeding. During an upfeed operation valve 122 is hydraulically connected with line P4 which at that time carries the same pressure as line P1. The combination of pressure in line P4 and the force of the spring within the valve is greater than the pressure of line P1 directed against the head end of check valve 122. Accordingly valve 122 is held closed.

Numerals 123 and 124 indicate rate-control valves for controlling the normal feed and the plunge-feed rates, respectively, by limiting the rate of discharge from the upper end of the cylinder 105. The setting of valve 123 is made to provide a slow or normal rate of feed and the setting of valve 124 is made to provide a faster rate of feed, i. e., plunge-feed. The selective operation of these valves in the hydraulic system is under the control of the solenoid-operated valve CD in a manner to be explained.

Numeral 125 indicates a pressure-relief valve connected across the forward pressure line P1 and the return line P5 to the tank T.

Numerals 126 and 127 indicate rate-controlling needle valves in the pressure lines leading to the outboard cylinder 109.

The hydraulic symbols herein employed are those of "Manufacturing Engineering Standards," February 1951, pages 5 through 8, also known in the industry as "JIC Hydraulic Standards." The present invention is not in any one component of the hydraulic system but in the cooperative combination, arrangement, and method of control with particular reference to the hobbing-machine combination described and claimed herein.

*Clamping circuits and plunge-feed*

Starting at the pump PF, oil under pressure is fed into line P, and assuming valve AF is shifted to the right, the pressure oil flows through the valve to line 130 and branch lines 131 and 132 connected with the cylinders 107 and 109. Return oil from these cylinders passes through lines 133, 134, 135, diagonally through valve AF to tank line *t* and to the tank T. When both cylinders stall themselves under their loads, the pressure in line P will rise, and, acting through line P, will effect opening of the sequence valve 120 so that pressure fluid may then flow through the valve in the direction of the arrow, to line P1. With 4-way valve BE also shifted to the right, the pressure in line P1 flows diagonally through the valve to line P4 and reacts on the check valve 122 and assists in holding that valve closed. The increasing pressure in line P1 thereupon opens back valve 136, which is built into counterbalance valve 121, and passes into line P2 connected with the underside of the carriage operating cylinder 105. The carriage 60 thereupon moves in an upward direction and fluid from the large end of the cylinder passes through lines P3 to 4-way valve CD. Assuming valve CD also to be shifted to the right, the discharged fluid passes diagonally through the valve to line 137 to the plunge-feed valve 124, which has been set to limit the rate of flow to a relatively fast rate of hob feed. Fluid leaves the valve 124 by lines 138 and 138a to valve CD (right position) and diagonally through the valve to tank line P5, and a portion may flow through line 138 to valve BE (right position) to tank line t. Excessive pressure in line P1 is prevented by the pressure relief valve 125 which operates to bypass fluid from the line P1 when a predetermined maximum pressure is reached. From the foregoing it will be seen that the work clamp motors 107 and 109 must first have been actuated to secure the work before pressure fluid is directed to the carriage motor 105, and only when sufficient work-clamping pressure is attained, will the carriage be actuated.

Normal feed

Up-travel of the hob carriage 60 continues at the plunge-feed rate determined by valve 124 until the hob reaches full cutting depth, at which time the carriage 60 actuates trip mechanism that functions to restore 4-way valve CD to midposition (wherein all lines are blocked off). Oil leaving the top end of the carriage cylinder 105 is thus passed through line P3, directly to the fine-feed valve 123 and thence via line 139 to the plunge-feed valve 124. Fine-feed valve 123 restricts the flow to the desired normal feed rate, and the flow of oil, after passing valve 124, passes through line 138 to valve BE, to the tank line P5. During the fine feed, the flows and pressures on the clamp motors 107 and 109 remain as described for the plunge-feed portion of the cycle.

End of cut

When the carriage reaches the end of the cutting stroke, trip mechanism is actuated which functions, as will later be explained, to restore 4-way valve BE to its midposition. This valve BE contains a bridging port 140, indicated in the diagram, which operates to bypass the pressure fluid in line P1 directly to the tank line P5. The hob carriage thus comes to rest in its up position. Counterbalance valve 121 closes for lack of sufficient pressure in line P2 and the fluid is trapped in the small end of the cylinder 105 so that the carriage does not drop of its own weight. Check valve 136 also remains closed by reason of the greater pressure then existing in line P2 as against that existing in line P1.

Fast return

After a predetermined dwell of the hob at the end of the cut, hob and work rotations are stopped and electrical circuits are completed which effect shifting of 4-way valves BE and CD to their extreme left positions. When so moved, the pressure flow in line P1 passes straight through the valve BE to line 138, thence via line 138a to valve CD and line P3 to the top end of the cylinder 105. Fluid expelled from the bottom end of the cylinder passes back through line P2 and opens counterbalance valve 121 and mingles with the flow in line P1. Thus the oil expelled from the small end of the carriage operating cylinder 105 augments that supplied to the large end (upper end) and the hob carriage is caused to move downward at a fast return rate. As the stationary hob and work are in meshed relation, the hob may be traversed through the tooth spaces of the gear it had just operated upon. A small fraction of the fluid in line P3, which is now a forward pressure line, may flow through the fine-feed valve 123 and line 137 to valve CD and tank line 5, but its volume will be small and is more than compensated for by the volume received into line P1 from the small end of the carriage cylinder 105.

End of return

As the carriage reaches its down position (starting position), mechanism is tripped which effects restoration of 4-way valves BE and CD again to their midposition and the pressure fluid in line P1 is passed via its bridging port 140 to tank line t and P5. Also, when the carriage reaches its starting position, clamp valve AF is actuated to its extreme left position. When this occurs, the flows in motor lines 130 and 135 are both reversed, whereupon cylinder 107 is operated to unclamp the work, and cylinder 109 operated to elevate the outboard steadyrest 112. Needle valves 126 and 127 in the lines leading to the outboard cylinder 109 will have been previously set to throttle lines 132 and 133 so as to effect not only the desired rate response of the outboard steadyrest, but also to insure operation of the main clamp cylinder 107 first in the order of time.

Up traverse

If it is desired to move the carriage upwardly at a traverse rate, clamp valve AF can be in either its extreme right or left position and cylinders 107 and 109 will operate in a work-clamping or unclamping direction, respectively, as before explained. When in fully clamped or unclamped position the build-up in pressure in line P opens the sequence valve 120 and pressure fluid is diverted into line P1. Valve BE is shifted to its extreme right position, and valve CD to its extreme left position, and the pressure fluid in line P1 is directed to the lower end of the carriage cylinder through lines P1, check valve 136 of counterbalance valve 121, to line P2. Pressure in line P1 acting through line P4, also assists in holding check valve 122 closed. The liquid expelled from the upper end of the hob-carriage cylinder 105, passes through line P3 to valve CD, thence through lines 138a and 138 to valve BE and to tank line t and P5. As the cylinder discharge is unrestricted by being shunted around the rate-control valves 123 and 124, the carriage will travel upwardly at a rapid traverse rate.

From the foregoing it will be observed that among other features of this invention, the work is clamped hydraulically and must always be securely clamped, when so desired, before there can be a diversion of pressure fluid to propel the carriage, also that the rate of travel of the hob slide is controlled by regulating the rate of cylinder discharge, three different rates of travel in one direction and a fourth rate in the opposite direction may be provided, all obtained from the one source of power. The clamp valve AF, the selector valve BE, and the rate valve CD are, as has been previously indicated, solenoid-operated.

Hob-slide trip mechanism

Figure 2:
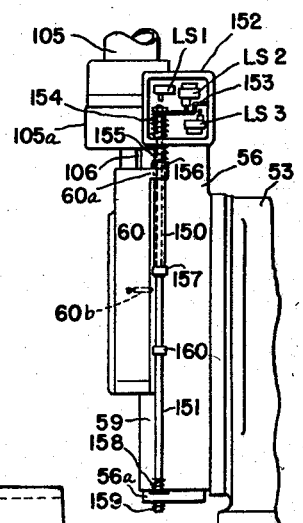
Fig. 2 is a side view of a portion of the machine showing parts of the feed trip mechanism.

As shown more clearly in Figs. 1 and 2, the automatic tripping mechanism that controls rate and direction of movement of the carriage 60 includes a pair of telescoped rods 150 and 151, each of which is adapted to be actuated by the carriage to make or break certain control circuits. The rod 150 is in the form of a tube, the upper end of which enters a housing 152, that in this instance forms a part of the support 105a of the hydraulic feed cylinder 105. The tube 150 carries a leaf-spring extension 153 positioned to actuate limit switches LS2 on an upward movement and LS3 on a downward movement. The tube and its extension are normally held in an intermediate position by opposing springs 154 and 155 that react against the housing 152 and leaf spring 153 and adjustable collar 156 on the tube. The lower part of the tube 150 carries a second adjustable collar 157 and between the two collars, a lug 60a on the carriage is caused to operate, engaging one or the other at the end of its preset travel.

The inner rod 151 also extends into the housing 152 and is arranged to actuate limit switch LS1 mounted in the housing. The rod 151 is counterbalanced by opposed springs 158 and 159 that react against a trunnion extension 56a and retaining rings carried by the rod.

The carriage 60, in addition to the lug 60a also carries a spring-loaded plunger 60b whose rounded end is positioned to engage an adjustable collar 160 on the rod 151 and after actuating the rod, to ride by. Briefly, the operational cycle is as follows: when the carriage 60 is in its lowest preset position, lug 60a is engaging collar 157 and holding limit switch LS3 closed. Carriage plunger 60b is below trip collar 160. When the up travel of the carriage is instituted, it moves up at a plunge-feed rate until the slide plunger 60b engages and actuates trip collar 160 on rod 151 to close limit switch LS1. Thereupon, the carriage continues its up travel at a normal feed rate until the carriage lug 60a engages stop 156 and actuates limit switch LS2 at which time the upfeed stops. After an interval of dwell in the up position, down travel of the slide is instituted and continues until the slide lug 60a engages trip collar 157 and actuates limit switch LS3 and holds it closed, thus stopping the down travel of the carriage. The carriage remains at rest in its down position until another cycle has been instituted.

*Electrical control circuits*

Figure 11:
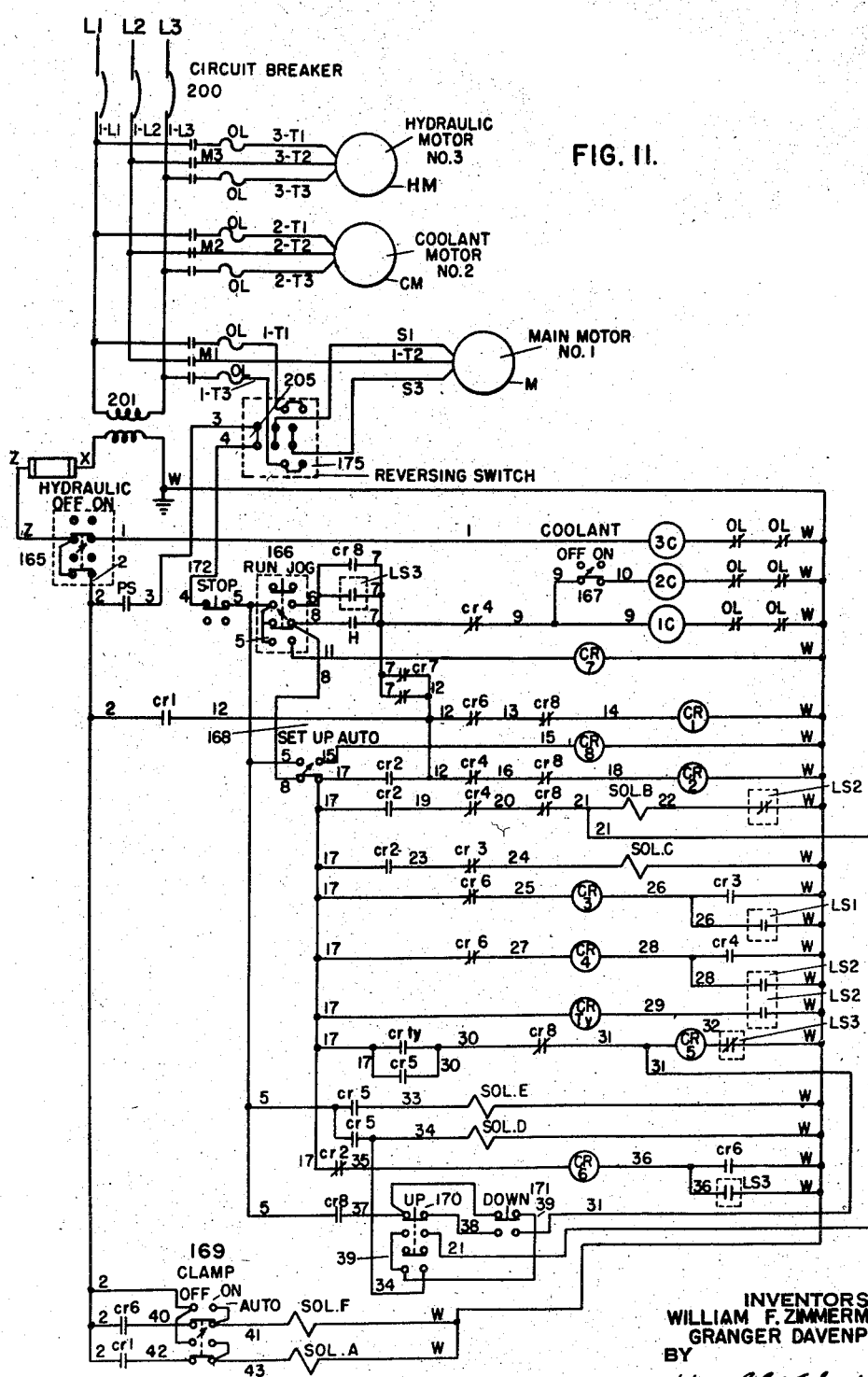
Fig. 11 is an elementary diagram of a representative electric control system for the machine.

The wiring diagram for the machine, including the power lines, contactors, and motors for the various transmission trains and pumps, is illustrated in its elementary form in Fig. 11. The lower right portion of Fig. 12 illustrates a control panel CP and an arrangement of the control panel buttons by which the various movements and actions may be instituted and controlled.

The operator, having determined the speeds and set the swivel trunnion 56 and the hob swivel head 61 to the required angle for the gear to be cut and the hob to be used, loads the work blank on the work table 57 and places a U-collar 108a on the draw rod 108 of clamp motor 107.

At the start of an automatic cycle of operation, it will be understood that the carriage 60 is down and limit switch LS3 is closed.

*Automatic cycle*

(Figs. 1, 2, 10, 11 and 12)

To cause the machine of this invention to perform a complete hobbing cycle the operator will then proceed as follows:

A. Turn Hydraulic switch 165 to On position which completes a circuit between main line Z and lines marked 1 and 2. Line 1 energizes contactor coil 3C of contactor 151 for hydraulic-pump motor HM and the constant-delivery pump PF starts delivering oil into the system.

B. Turn Run-Jog pushbutton switch 166 to Run position. (Normally the jogging contacts of this switch are closed as indicated in Fig. 11 and form part of a holding circuit for the main-motor starter coil 1C.) This switch is a commercial item and is equipped with a cam that is turned when the button is turned from Run to Jog and latches the jogging contacts open.

C. Coolant-motor selector switch 167 is turned On, which completes a portion of the circuit to coil 2C of the coolant motor starter.

D. Selector switch 168 is turned to Auto which closes the main control circuit between lines 8 and 17 and opens the circuit to line 15 that forms an essential part of the control circuit provided for manual operation.

E. Work-clamping selector switch 169 is turned to Auto, which opens parts of the control circuits that are used when clamping and unclamping the work under manual control.

The operations A thru E above, are performed as part of setup operations and before the operator loads a workpiece. When the operator loads a workpiece the hob carriage 60 will be down and the boss 60a thereof against the stop collar 157 and switch LS3 is held closed. After loading a blank upon the work table 57 and inserting U-collar 108a about the draw-rod 108 of the work-clamp motor 107, the Run button 166 is pressed.

When the Run button 166 is pressed, the following circuits are made:

(1) A circuit is completed through lines 2, 3, 4, 5, 6, LS3, 7, and 9 to the main motor contactor coil 1C and through switch 167 and 10 to the coolant-motor contactor coil 2C and these motors operate to drive the work table 57 and hob spindle 84 and to provide a cutting compound or coolant to the hob. Operation of the coil 1C closes switch marked H and completes a holding circuit, through Run-Jog pushbutton 166, thus continuing electric power in line 7. Power is brought to the Run-Jog switch through a pressure switch PS between lines 2 and 3, a safety switch built into the reversing switch 175 between lines 3 and 4, and a Stop switch between lines 4 and 5, all in series.

(2) Control relay CR1 is energized, through lines 7, 12, 13 and 14, and closes relay switch cr1 between lines 2 and 12 for a holding circuit, and another switch cr1 between lines 2 and 42 to energize solenoid coil SOL.A which effects shifting of the clamp valve spool to the right, thus connecting the right circuit 130 with fluid pressure. Fluid under pressure supplied by pump PF is thereupon directed to the clamp motors 107 and 109 as previously explained.

(3) Control relay CR2 is energized, through lines 7, 12, 16 and 18, which closes switch cr2 between lines 12 and 17, also closes another switch cr2 between lines 17 and 19, 20, 21 leading to solenoid coil SOL.B of valve BE, and also closes another switch cr2 between lines 17, 23 and 24 to solenoid coil SOL.C of valve CD, and opens normally closed switch cr2 between lines 17 and 35 to control relay CR6 so that the work will not be unclamped until the cycle is completed. When solenoids SOL.B and SOL.C are energized, the spools of their respective valves both shift to their right positions whereupon fluid is permitted to discharge from the upper end of the carriage feed cylinder 105 via valve 124 and the carriage moves up at a plunge-feed rate after the work is clamped. The cutter, or hob, starts into the work blank at this relatively fast rate, and hobbing of the gear continues at this fast rate until the hob reaches full cutting depth, at which time—

(4) The carriage plunger 60b engages dog 160 and elevates rod 151 a sufficient distance for it to actuate limit switch LS1 to closed position. The closing of LS1 completes a circuit between lines 17, 25, 26 and W of control relay CR3. Actuation of CR3 closes switch cr3 in its holding circuit between lines 26 and W, and opens normally closed switch cr3 in the circuit 17, cr2, 23, 24 of solenoid SOL.C. When SOL.C becomes deenergized, the valve CD shifts automatically to its midposition and blocks the flow from lines P3 to 137 and plunge-feed valve 124. The discharge from the feed cylinder 105 is then shunted through the fine-feed or normal-feed valve 123, as previously explained, and the hob continues upfeeding at the normal feed rate and carriage plunger 60b rides by dog 160.

(5) The hob continues upfeed at the normal rate until the work blank is finished, whereupon the carriage lug 60a engages collar 156 and lifts tube 150 until leaf spring 153 engages and actuates limit switch LS2 to closed position. When LS2 closes, a circuit is completed in lines 17, 27 and 28 of control relay CR4, which on being energized, closes switch cr4 in its holding circuit, opens normally closed switch cr4 in the circuit of solenoid SOL.B, opens normally closed switch cr4 in the circuit to motor contactors 1C and 2C and and the main-drive and coolant motors stop, opens normally closed switch cr4 in the circuit of control relay CR2, and energizes control relay CR–Ty. When SOL.B is thus de-energized at the completion of the upfeed, the valve BE automatically shifts to its centered position (pressure fluid in P1 is then bypassed to the tank). The energizing of control relay CR–Ty closes switch cr–ty between lines 17 and 30, 31 and 32 of control relay CR5. (The circuit to relay CR5 is completed at the expiration of a time period during which the hob dwells in its upper position.) At the expiration of the time period CR5 is energized and closes switch cr5 in a holding circuit around cr–ty and closes two switches cr5 in the circuit between lines 5 and 33 of solenoid SOL.E, and between lines 5 and 34 of solenoid SOL.D. When SOL.E and SOL.D are energized the spools of the respective valves CD and BE are shifted to their extreme left positions whereupon pressure fluid is directed, as above explained, to the upper end of the carriage cylinder 105 and the carriage is propelled downwardly at a rapid-traverse rate.

(6) The carriage continues downward travel until the hob clears the underside of the finished gear at which time the carriage lug 60a engages collar 157 and actuates the tube 150 downwardly to actuate limit switch LS3. When LS3 is operated, the normally closed side thereof opens and breaks the circuit to control relay CR5 which opens switches cr5 in the circuits to SOL.D and SOL.E. Valves CD and BE move to their midpositions under the action of their centering springs and down travel of the carriage stops. The normally open side of LS3 closes to complete a circuit to control relay CR 6, and the latter on being actuated, closes switch cr6 in its holding circuit, and opens normally closed switch cr6 in the circuit to control relay CR1. When CR1 de-energizes, it opens the switch cr1 in the circuit to SOL.A of the clamp valve AF. Actuation of relay CR6 also closes switch cr6 in the circuit to SOL.F and the clamp valve AF shifts to its extreme left position and pressure fluid in line P actuates the clamp motors 105 and 109 in an unclamping direction.

(7) With the cutter and work stationary, the carriage down, and the work unclamped, the operator may change work pieces and repeat the cycle.

MANUAL OPERATION

Main motor M

Figure 9:
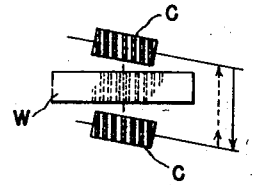

The main-drive motor M is of the reversible type and its direction of operation is controlled by a reversing switch 175 (drum type) which may be actuated by a handle 176 (Fig. 9). Ordinarily, the direction of rotation is not changed but when the hob swivel head is swiveled from left-hand to right-hand helical-gear cutting and it is desired to have the hob spindle continue to revolve in the direction for "climb" cutting, the motor rotation must be reversed due to the reorientation of the hob-spindle axis through approximately 180°. Such a changeover is not a frequent occurrence and it is a simple matter to set the drum switch manually as the occasion requires. Also, by using a reversing switch and presetting it for the motor rotation desired, only one main starter switch is required which makes for a more simplified electrical control system.

To start the main-drive motor M, the selector switch 168 is turned to Setup; the automatic-cycle control, initiating with line 17, thereby becomes dead, and another circuit is made frm line 5 to line 15 and control relay CR8. Energization of CR8 closes switch cr8 between lines 6 and 7 around limit switch LS3 in the circuit to the main-motor starter coil 1C. Thereafter, the main-motor M may be started by pressing the Run button 166 and be stopped by pressing Stop button 172. Pressing of the Run button 166 completes a circuit through lines 2, 3, 4, 5, 6, switch cr8, lines 7, 9 to main-motor starter coil 1C. Actuation of the main-motor starter closes switch H in lines 7, 8 and completes a holding circuit through the jogging contacts of the Run-Jog switch. Pressing the Stop button 172 opens this circuit and the motor M stops.

Main-motor jogging circuit

This circuit includes the Jog portion of Run-Jog button 166 which is connected to line 5 around Run portion of button 166 and switch marked H between lines 8 and 7. (Normally the jogging contacts are closed as indicated in Fig. 11 and form part of a holding circuit for the main-motor starter coil 1C.) This button is equipped with a cam which is turned when the button is turned from Run to Jog and latches the jogging contacts open. Hence when button 166 is pressed, a circuit is completed thru lines 5, 6, 7, 9, to 1C and interrupted when the button is released and the main motor runs only as long as the button is held down.

Work-clamp and support-arm operation

For work-clamp cylinder operations, the clamp selector switch 169 is turned to its On position which closes the circuit lines 2 and 43 to solenoid SOL.A. The valve AF thereupon shifts to the right and pressure fluid is directed to cylinders 107 and 109 which respond in a work-clamping direction. With switch 169 in the On position the circuits through line 2, switch cr6 and lines 40 and 41 to solenoid SOL.F and through line 2, switch cr1 and lines 42 and 43 to solenoid SOL.A are opened which prevent the automatic operation of the solenoids and valve AF.

To unclamp the work and raise the support arm 112 the clamp selector switch 169 is turned to Off which closes the circuit between lines 2 and 41 to solenoid SOL.F. The valve AF thereupon shifts to the left and pressure fluid is directed to cylinders 107 and 109 which respond in a work-unclamping direction. With switch 169 in the Off position the circuits through line 2, switch cr6 and lines 40 and 41 to solenoid SOL.F and through line 2, switch cr6 and lines 40 and 41 to solenoid SOL.F and through line 2, switch cr1 and lines 42 and 43 to solenoid SOL.A are opened which prevents the automatic operation of the solenoids and valve AF.

It will be observed from Fig. 11, there is one control system including line 2, for an automatic cycle and other independent coordinated but mutually exclusive control systems for the several operating parts and functions of this machine.

Carriage traverse (hydraulic cylinder 105)

Movement of the carriage 60 up or down under manual control, may be effected by first turning selector switch 168 to Setup which opens the circuit to line 17 and closes the circuit between lines 5 and 15 to control relay CR8. The energization of CR8 closes switch cr8 in the circuit between lines 5 and 37 and the Up and Down pushbuttons 170 and 171. When the Up button 170 is pressed, a circuit is completed between line 37, down switch 171, lines 39, 34, and 21 leading to solenoids SOL.D and SOL.B, respectively, whereupon valve CD is shifted to the left (Fig. 10) and valve BE shifted to the right. The shifting of valve BE to the right from its normal midposition cuts off the pressure line P1 from return line P5 and directs the fluid to the underside of the piston of the carriage cylinder 105. Simultaneously the discharge from the cylinder in line P3 is caused to bypass rate-control valves 123 and 124 and flows through valve CD to lines 138a, 138 and diagonally through valve BE to line tank lines t and P5. Up-travel of the carriage proceeds at a rapid traverse rate so long as the Up button is held depressed or until the carriage lug 60a engages trip dog 156 and actuates limit switch LS2. When LS2 is actuated, the circuit of SOL.B (line 22) is opened and the valve BE shifts to midposition wherein pressure fluid in P1 bypasses through the bridging port in the valve directly to the tank line P5, and up-travel of the carriage ceases. The same occurs when the operator releases the Up button 170 and both valves BE and CD return to their midpositions.

For down-travel of the carriage, the Down button 171 is depressed. Button 171 receives current through the Up button 170 only when the latter is in released position, so that the two buttons cannot be effective simultaneously. Assuming the Up button is released a circuit is completed between lines 37 and 38 to the Down button 171, and when the latter is pressed, a circuit through line 31 to control relay CR5 is made. This circuit is broken if the operator releases the Down button or when the carriage travels down to the point wherein its lug 60a engages adjustable stop 157 and actuates limit switch LS3. When this occurs the normally closed side of LS3 opens the circuit of line 32 of control relay CR5. However, when CR5 is energized, switch cr5 in the circuit 5, 33 to SOL.E is completed and valve BE is shifted to the left (Fig. 10), also switch cr5 in the circuits 5, 34 to SOL.D is completed and valve CD shifts to the left (Fig. 10). When both valves are in their left positions, pressure fluid in line P1 is directed through valve BE to lines 138 and 138a to valve CD, thence through valve CD to line P3 and the upper end of the carriage cylinder 105. Fluid discharged from the small end of the cylinder 105 passes through line P2, counterbalance valve 121 and mingles with that in line P1. The differential action of cylinder 105 thus causes the rapid descent of the carriage 60, until it is stopped by the trip dog 157 or by the operator releasing the Down button 170.

The main service lines are brought into the panel and connected to the input terminals of the circuit breaker 200 at L1, L2 and L3, and the output lines 1–L1, 1–L2 and 1–L3 connect with the different starters whose coils are marked 1C, 2C, 3C. Lines 1–L1 and 1–L3 also feed the primary winding of a transformer 201 whose secondary winding is grounded as at W, and the other line X leads to a fuse 203. The output side of the fuse connects at Z to terminal strip 204. Lines Z and W form the main bus lines of the control circuits of all the solenoids, relays and switches, of the electrical control system.

The output side of the main-motor starter has lines 1–T1 and 1–T3 connected with the reversing drum switch 175, and line 1–T2 connected with the motor. Lines S1 and S3 from the drum switch also connect with the motor and it is these latter two lines that are reversed when the drum switch 175 is turned from Forward to Reverse motor operations. To guard against failure to throw the drum switch completely to its Forward or Reverse position, means have been provided in the form of a safety switch 205 between lines 3 and 4 in series with but ahead of the Run-Jog and Stop buttons 166 and 172. The switch 205 is part of the drum switch 175 and is caused to open when the drum switch is actuated, thus breaking the circuits in the entire control system, excepting only the clamp and unclamp circuits of valve AF.

Figs. 11 and 12 also show another safety switch PS connected between lines 2 and 3. This switch is a normally open pressure switch that is caused to respond to its closed position when the fluid pressure in pressure line P attains a preselected minimum value. Accordingly, the hydraulic pump PF must first be operating and sufficient fluid pressure built up in the system before any of the electrical controls may operate, excepting again the manual control of the valve AF for the work-clamp cylinders. Also, should for any reason there be a failure in the hydraulic power the pressure switch PS automatically opens and interrupts any and all circuits, and the machine, if running, stops. The pressure switch PS is located in the hydraulic panel 181 and its leads 2 and 3 join with those of the valve solenoids A, F, B, E, C and D and enter the electrical panel 180 as a single cable 186.

*Control panels*

(Figs. 1 and 3)

In Fig. 3, the electrical control panel is indicated at 180 and the hydraulic control panel at 181. In Fig. 1 M is the main-drive motor, and HM the hydraulic-drive pump motor, and PF is the constant delivery hydraulic pump that receives fluid from the tank T through line 182 and delivers it by line P to the interior of hydraulic panel 181. CM (Fig. 3) is the coolant motor.

The electrical control panel 180, as indicated in Fig. 12, houses all the relays and switches described, except the limit switches LS1, LS2, and LS3 and the pushbutton switches which are located on panel CP. This control panel CP may be mounted at a convenient spot on the machine, preferably on the outboard support column 114, and the connections made to the main panel 180 by means of a cable 183. Connections from the limit switches LS1, LS2, LS3, are made by a flexible cable 184 leading to the main panel 180. The several motors M, CM and HM have their wires leading into the control panel as indicated in Fig. 12 and connected to their correspondingly numbered terminals of their respective starters.

Figure 7:
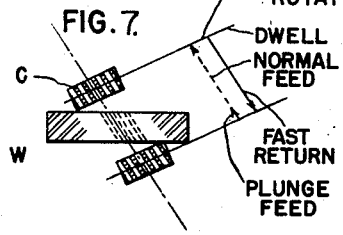
Figs. 7, 8 and 9 are diagrammatic views of a representative hobbing cycle's oblique feed and axial feed, respectively, that may be carried out by the machine of this invention.
Figure 8:
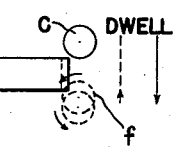

A representative oblique feed hobbing cycle is shown diagrammatically in Figs. 7 and 8 in which W represents the work and C the hob. At the start of the hobbing operation, the hob is set radially of the work the full depth of the teeth to be cut and in a position below the workpiece as indicated in dotted lines in Fig. 8. The trunnion will have been swung and clamped at the angle, relative to the work axis that coincides with the helix angle of the teeth to be cut. The axis of the hob will have also been swiveled to compensate for its lead whereby to position the helix of the cutting teeth in alignment with the oblique line of shift of the hob carriage. As viewed from the center of the work table, the hob is, in accordance with this invention, caused to be driven "top coming" so that it tends to "climb" the workpiece.

When the machine is otherwise ready for operation, the Run button is pressed and both work and hob are caused to be driven in constant speed ratio. Simultaneously, the up travel of the carriage is instituted and the hob moves diagonally upwards at a relatively rapid feed rate and plunges into the work at this rate. When the hob reaches its full cutting depth, indicated at f in Fig. 8, the plunge-feed rate is automatically reduced to a normal feed rate, and the diagonal upfeed continues at the reduced rate. As the hob completes the cut and is clear of the work, both hob and work rotations are stopped, and after a momentary dwell of the hob in the up position, the down travel of the hob is instituted and the now stationary hob moves diagonally downwardly through the tooth spaces in the blank at a relatively rapid rate and comes to rest at the underside of the work. The operator then changes workpieces and the machine is at once ready for another hobbing cycle. A like cycle of operation may be carried out when the machine is set up for hobbing spur gears. Such a condition is represented in Fig. 9 wherein the swivable guides for the hob carriage (not shown) are set vertically, i. e., parallel to the axis of the work C, in which case the hob carriage is caused to move vertically as represented by the arrows at the right of the figure. In this setup the hob also is caused to start from a point below the work. feed upwardly, enter the work at a plunge-feed rate, and continue at that rate until full tooth form is reached. At this time the feed rate is reduced to normal, as before explained, and the feed continues until the cutter has finished the gear. When the cutter has cleared the work, upfeed stops and after a momentary dwell the down travel of the hob through the tooth spaces is instituted and continues to the point of beginning. During the dwell period the cutter and work rotations are stopped and the return travel takes place with neither hob nor work rotating.

Without further analysis, the foregoing will so fully reveal the gist of this invention that others can, by applying current knowledge, readily adapt it for various utilizations by retaining one or more of the features that from the standpoint of the prior art fairly constitute essential characteristics of either the generic or specific aspects of this invention, and therefore such adaptations should be, and are intended to be, comprehended within the meaning and range of equivalency of the following claims.

Having thus revealed this invention, we claim as new and desire to secure the following combinations and elements, or equivalents thereof, by Letters Patent of the United States:

1. A helical gear hobbing machine having a rotatable work spindle adapted to support a workpiece, a rotatable hob spindle adapted to support a hob in operative relation with the workpiece, a vertically translatable hob spindle carriage for carrying said hob spindle, and drive means for driving the work and the hob spindles non-differentially, the combination of a relatively stationary support for mounting and guiding the hob spindle carriage during vertical movement thereof, hydraulic motor means comprising a piston and a cylinder element operatively connected with the carriage and with said support, a source of fluid pressure for actuating said hydraulic motor means, a forward pressure line connected between said hydraulic motor means and said source of fluid pressure, a fluid reservoir, a return pressure line leading from said hydraulic motor to said reservoir, valve means in said pressure lines for controlling rate and direction of motor actuation whereby to control the rate and direction of translation of said hob spindle carriage, and means to actuate said valve means to effect a selected rate or direction of movement of the hob spindle carriage, said valve means including direction control valve mechanisms in the forward pressure line and rate control valve mechanisms in the return line operative when effective to control the rate of hob carriage translation by controlling the rate of motor discharge.

2. The combination of claim 1 including a counterbalancing check valve connected across the pressure lines leading to and from the motor operative to pass fluid from one of said pressure lines to the other when the pressure in the said one line exceeds a predetermined pressure value in excess of the pressure created incident to the weight of the hob carriage.

3. A power transmission for translating the hob carriage of a hobbing machine comprising a differential type hydraulic motor having a piston and a cylinder operatively connected with the carriage and a relatively stationary support, a fluid pressure system for actuating the motor including a pump, a reservoir, and fluid connections including a forward pressure line and a return pressure line and a bypass line between said motor and the pump and the reservoir, rate control valve means in the return pressure line adapted when effective to control rate of carriage travel by controlling the rate of discharge from the motor, and selector valve means in said fluid connections operative in one position to direct pressure fluid selectively to one side of the piston of said motor and the discharge therefrom through said return line and the rate control valve means, therein, and in another position to direct pressure fluid to the other side of the piston of said motor to effect slide movement in the opposite direction at a different rate and counterbalancing check valve means connected across the lines connected with the motor operative to conduct motor discharge fluid into the said forward pressure line only when said selector valve is a position effective to direct pressure fluid to the larger end of said differential motor.

4. A power transmission for translating the hob carriage of a hobbing machine comprising a hydraulic motor of the piston and cylinder type operatively connected with the carriage and a relatively stationary support, fluid pressure system for actuating the motor, including a pump, a reservoir, and fluid connections, including a forward pressure line and a return pressure line and a bypass line between said motor and the pump and the reservoir, rate control valve means in the return pressure line adapted when effective to limit the rate of discharge from the motor, and selector valve means in said line connections operative to direct pressure fluid selectively to one side of the piston of said motor and the discharge therefrom through said return line and the rate control valve means therein to effect carriage movement in a given direction at a given rate or to direct pressure fluid to the other side of the piston of said motor and the discharge from the motor through said bypass line to effect carriage movement in the opposite direction at a different rate, said rate control valve means comprising two independently settable rate control valves and an additional valve for connecting the said two rate control valves selectively in series and in parallel whereby to effect either of two feed rates in one direction of carriage movement.

5. The combination of claim 4 including in combination means responsive to the movement of the carriage in one direction for rendering said additional valve means effective to connect the said rate control valves in parallel thereby to effect a change in the said given rate of travel of the carriage in said one direction.

6. A helical-gear hobbing machine having in combination a rotatable and translatable hob spindle and a rotatable work spindle, means for translating the hob spindle relative to the work spindle in a linear path disposed at an angle to the axis of the work spindle at one of two or more different hobbing rates of feed, means for rotating both spindles in constant speed ratio, and means automatically operative following the penetration of the hob into the work in performing a hobbing operation to change the rate of hobbing feed in said linear path from one hobbing rate to another hobbing rate.

7. The combination of claim 6 including means for rotating the hob spindle in a direction with the feed movement relative to the work.

8. In a machine for hobbing helical gears, a main frame member, a work spindle adapted to support a cylindrical work blank; means journaling the work spindle in the frame member for rotation about a fixed vertical axis; a rotatable and relatively shiftable hob spindle adapted to carry a hob of helical form; means mounting the hob spindle for bodily shift movement relative to the work spindle in a linear path corresponding to the helix angle of the teeth to be generated in the blank; additional means mounting the hob spindle for angular adjustment about a horizontal axis which extends generally radial of the work blank and perpendicular to the axis of hob rotation so as to position the line of movement of the operating teeth of the hob in alignment with the linear path of bodily shift of the hob; additional means for adjusting the hob toward or away from the axis of the work spindle to suit the diameter of the blank, diameter of the hob and depth of cut to be formed in the blank; power means connected to rotate the work and hob spindles at relatively constant speeds; and independent means for shifting the rotating hob in a linear path across the face of the work blank in the direction corresponding to the helix of the teeth to be formed in the blank, said independent means for shifting the hob in said linear path including feed-rate changing means operative to shift the hob relative to the blank selectively at a normal cutting feed rate and at a cutting feed rate faster than normal; and control means for said rate changing means including trip mechanism operatively associated with said shiftable hob and with said means mounting the hob spindle for bodily shift movement and responsive to the shift movement of the hob for actuating said control means to effect bodily movement of the hob at the said faster-than-normal cutting rate as the hob enters the work blank and begins the tooth generating operation and to effect bodily movement of the hob at the normal cutting rate just before full tooth generation by the hob on the work blank is reached and to continue the last mentioned rate of bodily shift movement of the hob for the remainder of the generating of helical teeth in the blank.

9. The combination of claim 8 in which the direction of hob rotation is in the direction as for climb cutting and the direction of bodily shift movement of the hob is from a starting position below the plane of the work blank to a finishing position above the plane of the work blank.

References Cited in the file of this patent

UNITED STATES PATENTS

| | | |
|---|---|---|
| 2,336,849 | Davenport | Dec. 14, 1943 |
| 2,356,796 | Purvin | Aug. 29, 1944 |
| 2,364,932 | Warner et al. | Dec. 12, 1944 |
| 2,368,061 | Wortendyke | Jan. 23, 1945 |
| 2,374,255 | Davenport | Apr. 24, 1945 |
| 2,561,706 | Miller | July 24, 1951 |

FOREIGN PATENTS

| | | |
|---|---|---|
| 141,002 | Australia | Apr. 30, 1951 |
| 1,072,830 | France | Mar. 17, 1954 |

OTHER REFERENCES

Gear Cutting Machinery; copyright, 1909, by Flanders—TJ187F5, pages 173–175.